United States Patent [19]

Loris

[11] Patent Number: 4,683,633

[45] Date of Patent: Aug. 4, 1987

[54] ARTICULATE RAFTER FRAMING JIG AND METHOD OF USING SAME

[76] Inventor: J. Loris, 720 Beaver St., #E, Santa Rosa, Calif. 95404

[21] Appl. No.: 833,126

[22] Filed: Feb. 26, 1986

[51] Int. Cl.[4] ........................ B23Q 17/00; B23Q 3/18; B23Q 1/04; B25B 1/20

[52] U.S. Cl. ........................................ 29/407; 269/45; 269/60; 269/76; 269/82; 269/97; 269/249; 269/910

[58] Field of Search ...................... 29/407; 269/45, 60, 269/76, 82, 97, 249, 910

[56] References Cited

U.S. PATENT DOCUMENTS

| | | | |
|---|---|---|---|
| 3,883,128 | 5/1975 | Breese | 269/45 |
| 4,071,061 | 1/1978 | Schneider | 269/45 |
| 4,226,409 | 10/1980 | Hanna | 269/910 |
| 4,278,244 | 7/1981 | Carter | 269/249 |
| 4,418,901 | 12/1983 | Woods et al. | 269/82 |
| 4,500,077 | 2/1985 | Coxon | 269/45 |

*Primary Examiner*—Howard N. Goldberg
*Assistant Examiner*—Steven Nichols

[57] ABSTRACT

An articulated rafter framing jig and it's method of use and structure. It depends on the correct usage of the jig to hold securely and quickly rafter stock so that accurate marking for seat cuts, cheek and plumb cuts be made without use of complicated measurements, tools or calculations and needs only one measurement to accurately position a rafter stock in jig relative to other roof members, thereby saving time and expense.

2 Claims, 5 Drawing Figures

ARTICULATE RAFTER FRAMING JIG AND METHOD OF USING SAME

BRIEF SUMMARY OF THE INVENTION

This invention makes possible rapid as well as accurate layout markings of rafters for cutting and fitting as used for roof framing of buildings. The invention simplifies a complex task, and allows less skilled workers to produce high quality results.

Heretofore traditional methods and tools for rafter framing often involved use of complex tables, books, or rules and a high degree of skill to layout and mark rafters. This invention requires using only ONE easily obtained dimension as will become apparent from a consideration of the drawings and further description thereof.

DETAILED DESCRIPTION PHYSICAL STRUCTURE

Figure 1:
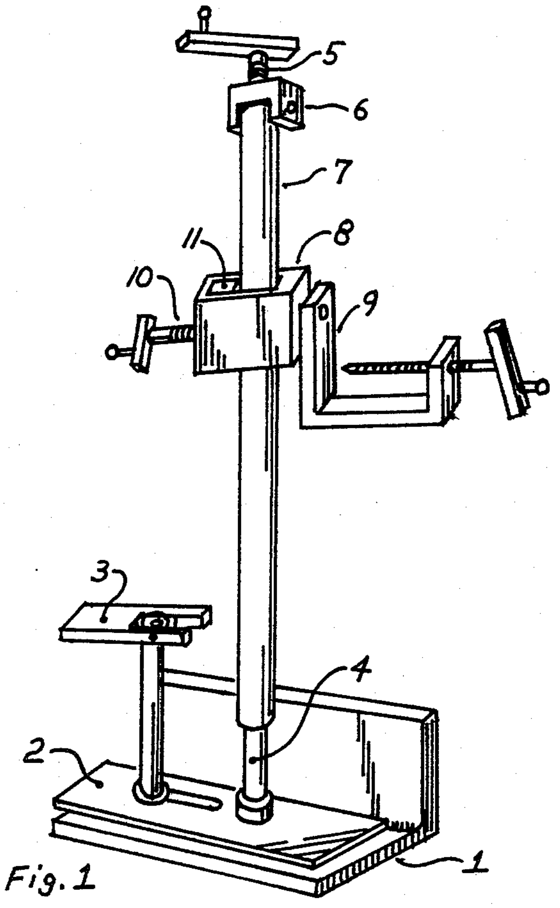
FIG. 1. Perspective view of the rafter framing jig showing it assembled and ready to use.

FIG. 1. shows perspective view of the invention assembly.

BASE 1. is made of a strong metal and can be of angle iron, aluminum, extrusion or welded plate or a suitable high strength material of thickness to be able to remain very rigid under all use conditions. Aircraft quality aluminum about ⅜ inch is good. The bottom surface of base 1 must be long and wide enough to give a solid mounting stance to the jig when it is fixed in position as shown FIG. 5, clamped to Top Plate T. Base 1 fits on the top plate but must clear other framing members which may already have been installed such as common rafters or ceiling joists without interference with the operation of the invention.

BASE SLIDER 2. FIG. 1, fits on the top surface of base 1 and is made of strong material such as base 1 but with extra thickness to give rigid strength and be able to hold support rod 4 firmly.

SLIDE LOCK 3. FIG. 1 is a means of quickly locking base 1 to base slider 2. Lock 3 shown FIG. 2 comprises a common arrangement of threaded stud 12, nut 13, sleeve 14, washer 15 and a swing handle to tighten nut 13.

Figure 2:
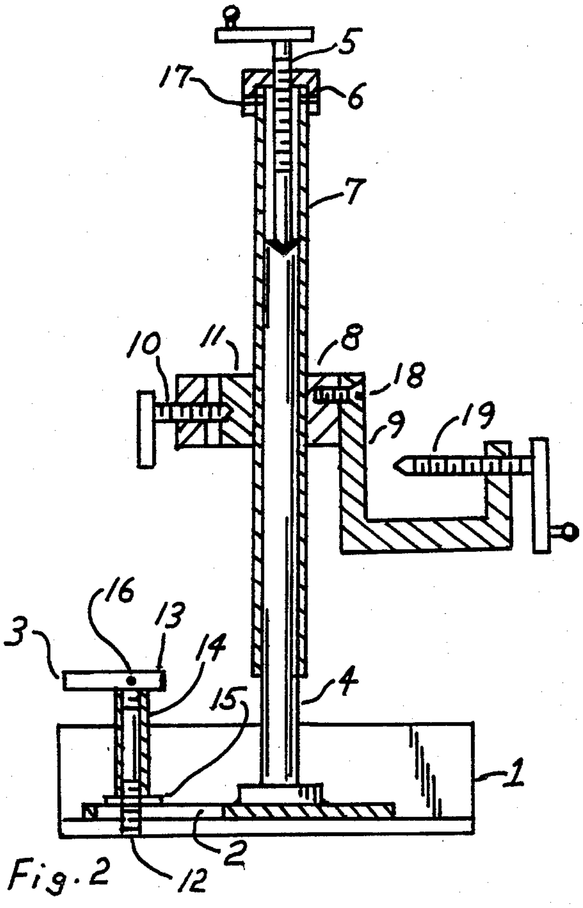
FIG. 2. Cutaway view of the important area of the invention.

SUPPORT ROD 4. shown in cutaway view FIG. 2 is a strong round shaft firmly attached to base slider 2. It can have a flaired bottom to make it easier to attach to base slider 2. Rod 4 is sized to fit with a close slip fit into support tube 7.

The length of rod 4 should be about 2 foot long or approx. ⅔ of the length of tube 7 into which it fits. The upper end of rod 4 is concaved slightly to accept the cone end of screw 5. Rod 4 is attached to tube 7 in slip fit only and allows tube 7 vertical movement and 360 degree rotation in the horizontal plane.

HEIGHT ADJUSTMENT SCREW 5. FIG. 2 shows a threaded rod 5 with crank handle attached. The length of screw 5 should be long enough to reach into tube 7 and contact the top of rod 4 and still have about 6 inches for use in height adustment. This is to allow vertical adjustment of support 7. Screw 5 should be threaded for easy movement when a load is applied to jig. The diameter of screw 5 is smaller than the inside diameter of tube 7 so as to give good clearance and avoid contact of revolving threads and the inside surface of tube 7.

Figure 3:
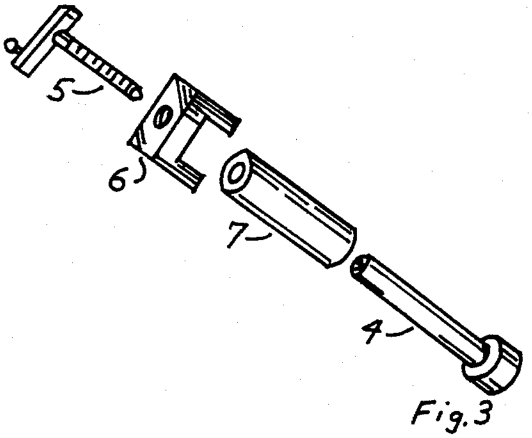
FIG. 3. Perspective view of part of the main support mechanism exploded.

TUBE CAP 6. shown FIGS. 1, 2, or 3, is a means of attaching height screw 5 to tube 7. Cap 6 is a fitting with a hole threaded to accept screw 5 and is clearanced as shown FIG. 2 cutaway view to fit tightly over the outside of tube 7, and is securred to 7 by means such as pins or weld in such a way that it will have sufficient strenght to hold up tube 7 when heavy weight is being supported by claim 9 of the jig.

SUPPORT TUBE 7 Shown FIG. 2 in cutaway view is made to slip fit closely over support rod 4 and is only firmly attached to cap 6. Tube 7 should be of high strength material with wall thickness and diameter large enough to prevent bending or collapsing when heavily loaded. from the weight of heavy rafters, or when vice 8 is locked in position tube 7 should not crush or deform.

SUPPORT TUBE 7 36 inches is about the maximum length necessary for tube 7 or about 25% longer than rod 4, so that most of screw 5 will remain inside and covered by tube 7. and thus protect the threaded section of 5.

Figure 4:
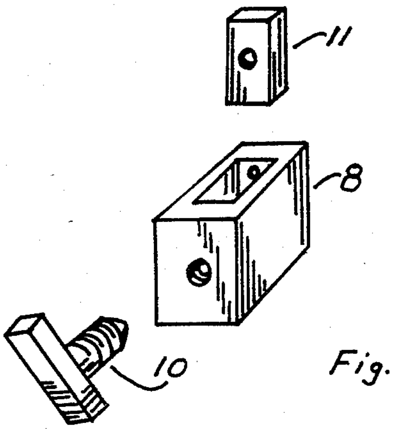
FIG. 4. View showing Tube Vice and it's main components exploded.

TUBE VICE 8 shown FIG. 1,2,4, consists of a strong block of aluminum or other suitable material which slips over tube 7 while allowing block 11 ample clearance to function. Vice 8 can be as shown FIG. 4 or made up of various blocks, plates etc., and fastened by bolt or welding means to make a strong assembly. Vice 8 is drilled and tapped at one end to accept screw 10 in a centrally located position. On the opposite end but higher up vice 8 is tapped to accept pivot screw 18. Clearances and smooth interior surfaces must be maintained inside vice 8 to prevent chatter or binding jamming during rapid adjustment up or down tube 7 of vice 8. Vice 8 should be tall enough to have several inches of contact with tube 7 vhen locked in position by block 11. The clamp 9 side of vice 8 ; must be parallel with and smooth as the inside surface of vice 8 where it contacts tube 7.

SWIVEL CLAMP 9 FIG. 1,2 is made of a strong material such as acft. alum. and should be sized to accept all regular rafter materials and weights. Clamps 9 is able to swivel while attached to vice 8 by screw 18, and a smooth surface is needed where clamp 9 mates to vice 8. When screw 19 is fully retracted in it's threaded hole of clamp 9 there should be about 4" of clearance for rafters to slip through the clamp.

SWIVEL CLAMP 9 When screw 19 is advanced in clamp 9 to secure rafters clamp 9 must not deflect or bend under the pressure from pinning heavy material, or the weight of such. Pivot screw 18 is fitted to a hole in claim 9 approximately 4 to 5 inches from the inside bottom and the threaded pinning screw hole is positioned about 1½ inches from the inside bottom of 9.

VICE LOCK SCREW 10 in FIGS. 1,2,4, is a standard threaded round stock approximately ½ diameter with a crank handle fixed securely and the opposite end which fits into a recess in block 11 is slightly rounded. When in use in vice 8 screw 10 should not have to be rotated more than ¼ turn from fully locked to full release.

JAMB BLOCK 11 shown FIGS. 2,4, is made of a very strong metal and fits loosely inside vice 8 with tube 7 also installed, and screw 10 in a retracted position. Screw 10 fits into a drilled hole in block 11 deeply enough so that block 11 will not fall out of vice 8 during movements of 8 up or down tube 7.

JAMB BLOCK 11 FIG. 2 should be made strong to resist warp or deflection under the high pressure being applied to it by screw 10 when locking support tube 7 in vice 8. Flat surfaces for both block 11 and inside vice 8 work well to prevent chatter.

STUD 12 shown FIG. 2 is threaded into base 1 at bottom and at top threaded to accept nut 13. Stud 12 should be high grade of 3 or 4 inches length. Stud 12 and base 1 act as guides with the slotted base slider 2 allowing smooth and controlled movement of base 2.

NUT 13 FIGS. 1, 2, works at top of stud 12 and has a short handle to help tighten or loosen nut 13. A steel can be used for nut 13 but must be sized to control sleeve 14.

SLEEVE 14 FIG. 2 slips closely over stud 12 and is strong to resist crushing or collapsing under pressure exerted by nut 13 during locking operation.

WASHER 15 FIG. 2 is steel and fits over stud 12 and keeps sleeve 14 out of slot on slider 2 without deflecting or causing binding during movements of slider 2.

PINS 16 FIGS. 1, 2, allow handle on nut 13 a 180 degree flip movement when stud 12 is close to rod 4 and pins 16 should be strong metal.

PINS 17 FIGS. 2 are steel of size and strength to fix cap 6 securely to tube 7.

PIVOT SCREW 18 FIG. 2. cutaway is made of high grade steel and threads into vice 8, but is smooth without threads on that part which fits through clamp 9. Screw 18 is flat headed and fits flush with surface of 9 and is also flaired to retain clamp 9. Screw 18 is locked in position but allows clamp 9 to swing free on surface of vice 8.

PINNING SCREW 19 in FIG. 2 is made like screw 5 but is shorter in length, and the end opposite crank handle being pointed slightly to indent the side of wood rafters firmly capturing same.

Figure 5:
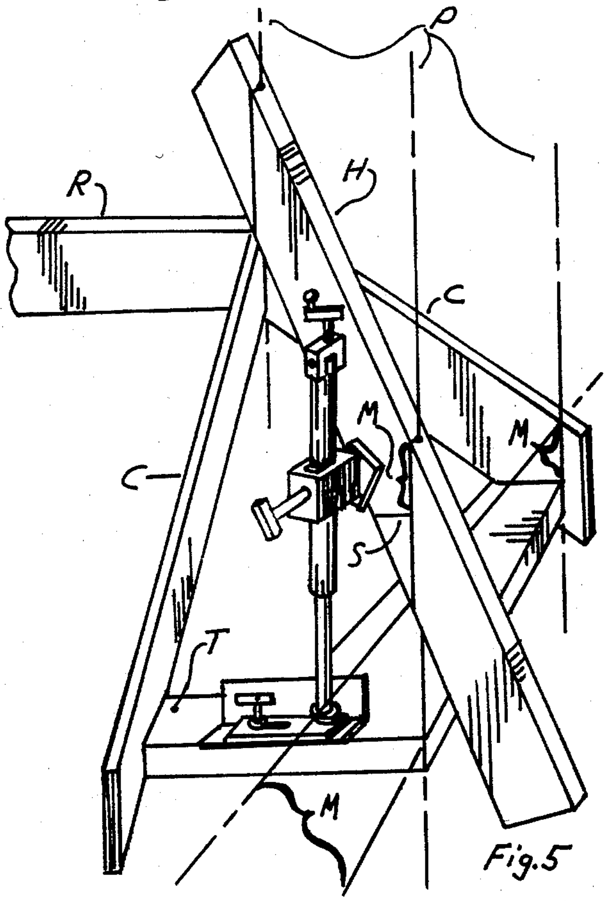
FIG. 5. Perspective view showing a typical placement of the invention when in use and how it relates to a hip rafter and other roof members.

FIG. 5 helps to show the invention and how it is used. The jig can be used during rafter framing of regular or irregular hip, valley, or other rafters for roof frames. FIG. 5 shows a typical arrangement of hip roof rafters with common rafters C resting on top plate T at their lower ends and meeting at their upper ends to form a junction with ridge R thus helping to support R. FIG. 5 shows the positions of these members relative to the H or hip rafter which is shown being held by the invention at the correct slope but not as yet cut or ready to install.

STEP ONE to operate jig place on the top plate T close to the outside corner and secure it by means such as carpenters clamp to the plate T as shown FIG. 5.

STEP TWO Loosen lock screw 10 FIG. 1, and lower vice 8 till swivel clamp 9 is near the lower part of tube 7 by base 1. Retighten screw 10 then open swivel clamp9 by retracting pinning screw 19 enough to accept the rafter stock. Slide rafter stock H up thru clamp 9 till upper end is well over and past junction of members C and Ridge R, retightening screw 19 pinning H in clamp 9. At the ridge R where the commons C form a junction use 2 large nails tacked into C to form a guide for H keep H aligned directly over said junction. It is important that rafter H not be pinned at the upper end only guided by the nails. as the tube vice 8 is moved up or down on tube 7 rafter must be free to slide at the upper end, exactly over the junction of members C and R while being supported by them at the upper end.

STEP 3 Check to see that the bottom of H is not touching plate T so that most of the weight of H will now be held by the Jig. See that the jig is holding the rafter H with it's vertical side plumb or 90 degrees to the surface of plate T.

STEP 4 FIG. 5 one of the plumb lines P is drawn to pass in a vertical plane directly up the outside corner of the top plate T. Center the bottom of H directly over and plumb with line P by loosening slide lock 3 FIG. 1 or the clamp holding base 1. then retighten. It is important to align the bottom center of rafter H exactly over the actual spot on T at the corner where it will land for final installation after the cutting operation.

STEP 5 check to see if upper end of H is still centered over junction of members C and R.

STEP 6 Crank height adjustment screw 5 FIG. 1 until the bottom of tube 7 is 2 inches up from base slider 2. Loosen vice lock screw 10 and move rafter H up or down so that when eye sighting along plate T toward rafter C the bottom edge of H is approximately at the same slope as or lines up with the top edge of rafter C . Re tighten lock screw 10 in vice 8. Swivel clamp 9 rotates in the vertical plane as tube vice 8 is moved up or dn. on 7 during slope adjustment and vice 8 also can rotate about rod 4 in the horizontal plane when adjusting slide in step 4.

STEP 7 In FIG. 5 common rafter C is attached to plate T and plumb line P is drawn vertically upon the side of C in line with the outer edge of top plates T. The distance M measured from the surface of T to the top edge of C is indicated in 3 different places in FIG. 5, all three dimensions are equal though not shown to scale. The distance M is the ONLY required measurement to position H to the exact slope needed to begin layout marking for rafter H. Being carefull to measure M exactly, a carpenters tri-square works quickly set it on plate T with calibrated blade in line with plumb line on C adjust trisquare to dimension M and lock in. Slide tri-square along plate T to where Jig is holding H and see if the tip of the square will just clear the edge bottom and slide under and touch the bottom center of H just as the square lines up at the outside corner of T on the plumb line P. Use height adjustment screw 5 to make accurate clearance dimension M. FIG. 5 already shows H being held at this distance M. The blank rafter is now correctly positioned and aligned at the same slope as it will be at when permanently installed. For narrow rafters H under 3 inches, transfer the point where the tri-square touched the bottom of H to the side by square marking across bottom of H. Now using a plumb line P mark it on the side of H as in FIG. 5. Measurement M is then marked on H vertically from top down along line P side edge. Where M ends this line mark a horizontal line for the seat cut or birds mouth 90 degrees to the plumb line on H. For hip rafters wider than 3 inches slide the tri square along T as before but stop the plumb edge side of H and adjust by screw 5 so the square just touches the bottom outside edge on H but does not slide under as before. This will automatically compensate for the seat cut height so the roof sheeting will meet on top of H correctly.

STEP 8 After the seat cut line S FIG. 5 is marked, without moving H or the Jig, go to the upper end of H where it is centered over the junction of R and C members and carefully mark the bottom of H using C members as a guide. These angle marks will be the angle to set the saw for the cheek cuts. Extend these marks to the bottom outside edge and then vertically up along a plumb line on side of H on both sides. Re check all cut lines for correctness then retract pinning screw 19, slide rafter up towards R a couple feet and flip H over on it's back and set back in Jig and secure with screw 19. Make cuts on rafter or release rafter and use ceiling joists to support one end. Use cut rafter as pattern for any others but check fit at other locations first. Valley rafters and jacks use same basic proceedure as above. Valley to hip jacks can be held and marked when jig is clamped to side of valley rafter with tube 7 in plumb position, marking same way as shown in step 8 upper end of H. Where redge beam is installed first but no commons are yet installed the invention can be used to position and mark seat and plumb cuts accurately using the same proceedure to obtain measurement M FIG. 5. and steps 6, 7, 8. The invention is of considerable help where only one worker is available and the roof being framed is not to a regular plan layout but has wall junctions at angles other than 90 degrees and ridge beams not centered in the span or unususlly placed . also where walls do not parallel each other requireing each rafter to be cut individually or to separate slopes. The invention frees the designer because unususll complex rafters can be quickly and accurately placed at a saving of time and material.

While the above description contains may specificities, these should not be construed as limitations on the scope of the invention, but rather as an exemplification of one preferred embodiment there of. Other variations are possible for example: hydraulics can be used to lift the vice and clamp, or a electric motor to run the adjustment screw, ratchet mechanisms could lock the movements together.

Accordingly, the scope of the invention should be determined not by the embodiment illustrated alone rather by the appended claims and their equivalents.

I claim:

1. A articulated rafter framing jig comprising:

a. a rigid base for supporting a sliding plate with vertical rod firmly attached and means for locking said plate to said base, b. an elongated rigid tube to slip fitting over said vertical rod and said tube capped by means to hold an adjustment device to said tube while top of said rod contacts bottom end of said adjustment device, while allowing said tube to fully rotate about said rod, c. a tube vice for fitting loosely over said rigid tube and a means to lock said vice to said rigid tube, d. a clamp for holding rafter material by a pinning device while said clamp being fixed to said vice but allowing said clamp to swivel about said vice and also pivot with said vice about said tube and or said rod.

2. A method using a articulated jig for rafter framing comprising the steps of:

a. mounting the jig on the wall top plate b. positioning said jig to accept various rafter stock c. securing hip rafter stock in said jig for alignment so that upper end of said rafter rests on and directly over the junction of common rafters with ridge members and guided thereon by means on each side of said hip and lower end of said hip being held by said jig directly over but not touching final installation position of said hip on said top plate, d. moving a vice with attached rafter clamp, up and down a pivotable support tube for holding and locking into position a slope adjustment of said hip, e. holding of said hip by said jig for checking of square positioning of said hip to said top plate and plumb line, f. adjusting said support tube with vice locked on said tube for controlling of said hip while horizontally aligning by means of said sliding plate and locking means, g. providing means for transferring of ONE measurement from said common rafter to locate for marking of seat cut line on said hip with said jig holding said hip to correct slope with bottom center of said hip just clearing said top plate corner by said ONE dimension measurement, from side of common, h. measuring of plumb line on side of said common a distance equal to that on said plumb line from said top plate surface along plumb line to top of said common for transferring to hip said one measurement for locating seat cut marking, i. marking of said hip seat cut lines and locating of upper end cheek cuts by use of commons as guides.

* * * * *